J. H. GIARTH.
TROLLEY WHEEL.
APPLICATION FILED APR. 14, 1908.
913,721.
Patented Mar. 2, 1909.
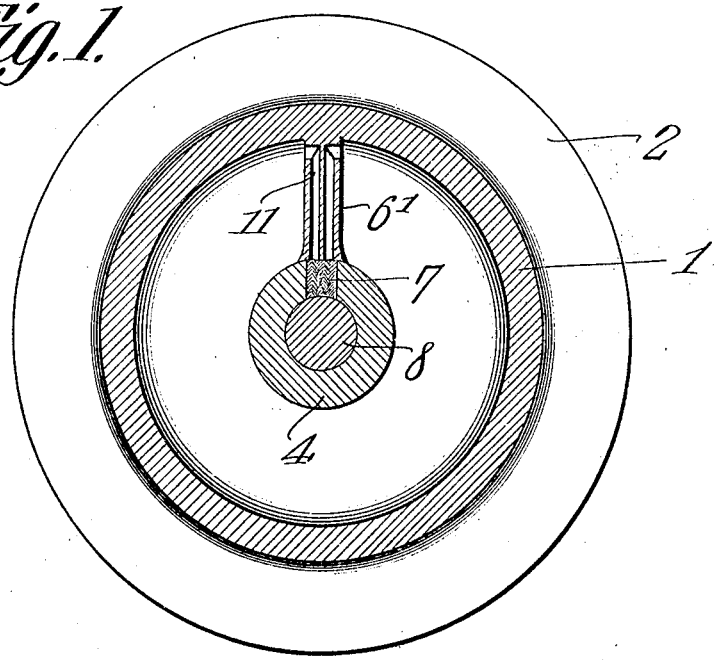
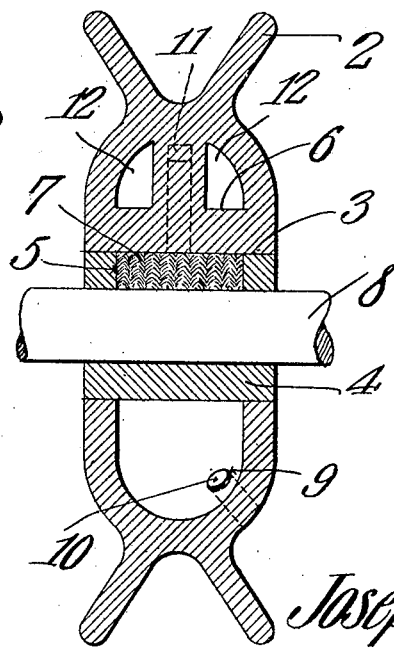

the wheel is rotating. By employing two pas-
UNITED STATES PATENT OFFICE.

JOSEPH H. GIARTH, OF ALTOONA, PENNSYLVANIA.

TROLLEY-WHEEL.

No. 913,721. Specification of Letters Patent. Patented March 2, 1909.

Application filed April 14, 1908. Serial No. 426,990.

*To all whom it may concern:*

Be it known that I, JOSEPH H. GIARTH, a citizen of the United States, residing at Altoona, in the county of Blair and State of Pennsylvania, have invented a new and useful Trolley-Wheel, of which the following is a specification.

This invention relates to new and useful improvements in trolley wheels and its object is to provide a wheel of this character having a hollow body portion constituting a lubricant receptacle.

Another object of the invention is to provide means within the wheel whereby the lubricant can be evenly distributed upon the axle of the wheel.

A further object is to provide a wheel of this construction which is practically formed in a single piece and which cannot readily get out of order.

With these and other objects in view, the invention consists of such novel features of construction and arrangement of parts as will be hereinafter more fully described and pointed out in the claims.

In the accompanying drawings, the preferred form of the invention has been shown.

In said drawings—Figure 1 is a section taken through the circumference of the wheel. Fig. 2 is a vertical transverse section therethrough.

Referring to the figures by characters of reference, 1 designates the wheel body, the same being hollow, as shown, and having annular diverging flanges 2 forming an annular groove therebetween for the reception of the trolley wire. Oppositely disposed alining apertures 3 are formed in the centers of the sides of the wheel and these apertures receive a tubular core 4 having a longitudinal slot 5 therein, the length of which is approximately equal to the width of the compartment within the wheel. Formed within the wheel and opposite the slot is a T-shaped web 6 constituting means for retaining a wick 7 within the slot 5. This wick is designed to bear upon the axle 8 of the wheel, which axle extends through the core, as shown particularly in Fig. 2. One or more openings 9 are formed within the wheel, so that a suitable lubricant can be supplied to the interior of the wheel body. These openings may be closed in any suitable manner, as by means of a screw plug 10.

The perpendicular member 6' of the web 6 has passages 11 therein opening at their inner ends into the slot 5 while their outer ends open in opposite directions close to the inner surface of the rim portion of the wheel. Spaces 12 are formed at the sides of this perpendicular member 6'.

When it is desired to use the wheel, it is first removed from the axle 8, after which the wick 7 is inserted into the core and thence into the slot 5. The wheel is then placed upon the axle and a lubricant is supplied to the interior of the wheel body through the openings 9. The wick 7 therefore operates to convey the lubricant to the axle 8 and to spread it evenly thereover. Inasmuch as the wick is disposed between the axle 8 and the web 6, it will be obvious that it can not become displaced.

By providing the spaces 12 surplus lubricant is free to circulate within the wheel. As the inlet ends of the passages 11 are close to the inner surface of the rim portion of the wheel all portions of the lubricant can be collected and directed onto the wick while the wheel is rotating. By employing two passages 11 the oil can be fed to the wick while the wheel is rotating in either direction. During this operation one passage acts as a vent while the other constitutes an oil duct.

The core 4 can be secured within the axle body in any preferred manner, as by shrinking the body thereon, or by using suitable fastening means, or, if preferred, the core and wheel body can be formed in a single piece. It will be seen that the wheel is simple, durable and efficient and, as it is formed in practically one piece, it has no parts to get out of order.

What is claimed is:

1. A trolley wheel comprising a hollow body, a longitudinally slotted core therein, a wick in the slot, said core constituting a bearing, means extending to the inner surface of the rim portion of the body for holding the wick within the slot, there being parallel ducts extending from the slot and within said means, said ducts opening through opposite faces of said means.

2. A trolley wheel comprising a hollow body, a core, a wick within the core, and a web in the body and having oppositely extending ducts for conveying lubricant to the wick, said ducts extending to the inner surface of the rim portion of the body, there being spaces at the sides of the web.

In testimony that I claim the foregoing as my own, I have hereto affixed my signature in the presence of two witnesses.

JOSEPH H. GIARTH.

Witnesses:
   J. B. SAUCERMAN,
   J. B. ERVING.